2 Sheets—Sheet 1.

W. A. LAIDLAW.

HAY PRESS.

No. 10,954. Reissued Aug. 28, 1888.

WITNESSES:

Fred G. Dieterich.

Amos W. Hart.

INVENTOR.

W. A. Laidla

BY

Munn & Co

ATTORNEYS

N. PETERS, Photo-Lithographer, Washington, D. C.

W. A. LAIDLAW.

HAY PRESS.

No. 10,954. Reissued Aug. 28, 1888.

WITNESSES:
Fred G. Dieterich
Amos W. Clark.

INVENTOR.
W. A. Laidlaw.
BY Munn & Co
ATTORNEYS.

N. PETERS, Photo-Lithographer, Washington, D. C.

UNITED STATES PATENT OFFICE.

WILLIAM A. LAIDLAW, OF CHEROKEE, KANSAS.

HAY-PRESS.

SPECIFICATION forming part of Reissued Letters Patent No. 10,954, dated August 28, 1888.

Original No. 359,081, dated March 8, 1887. Application for reissue filed July 7, 1888. Serial No. 279,337.

*To all whom it may concern:*

Be it known that I, WILLIAM A. LAIDLAW, of Cherokee, in the county of Crawford and State of Kansas, have invented a new and useful Improvement in Hay-Presses, of which the following is a specification.

My invention is an improvement in that class of presses known as "perpetual" or "continuous," and whose followers are operated by a reversible sweep that allows them to be thrown back (by the elastic rebound of the hay or other material being pressed) after reaching the limit of its forward movement.

The invention is embodied in the construction and combination of parts, as hereinafter described and claimed.

Figure 1:
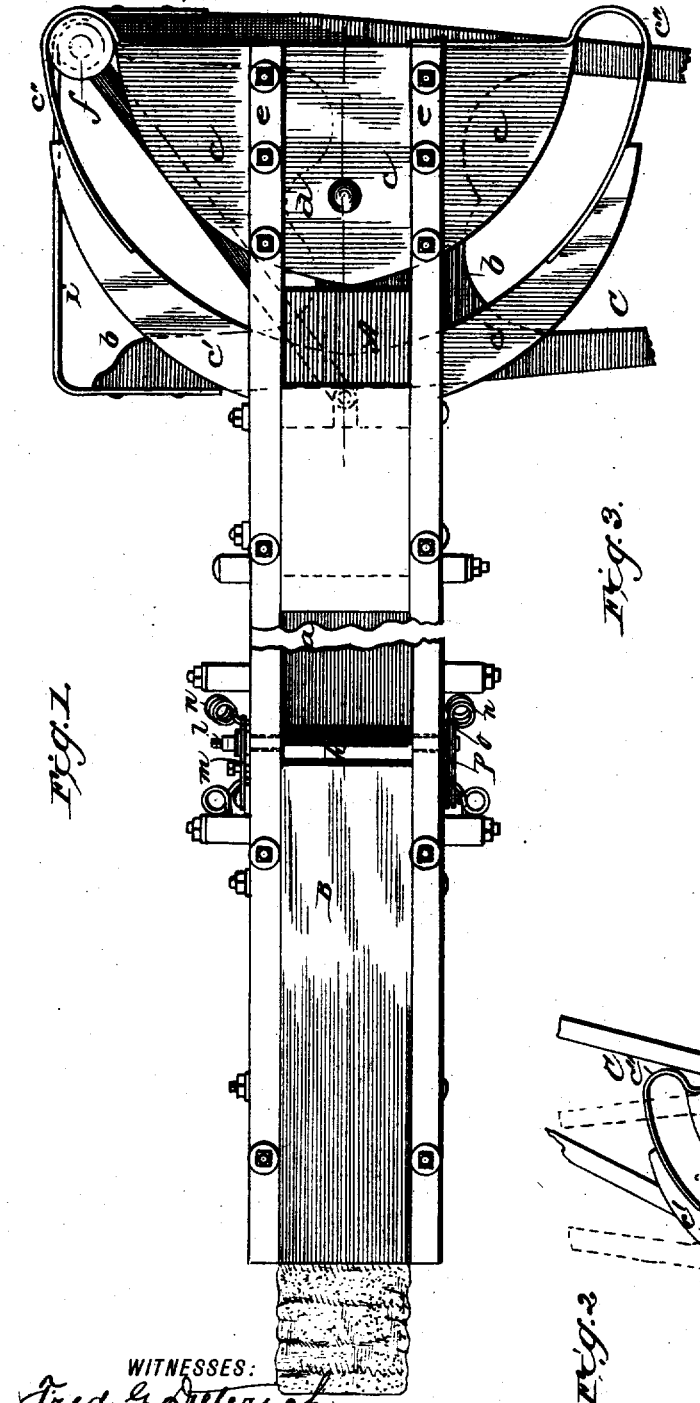
Figure 3:
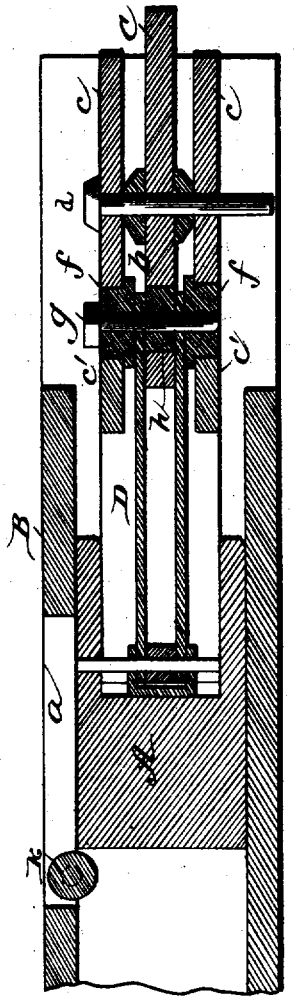
Figure 2:
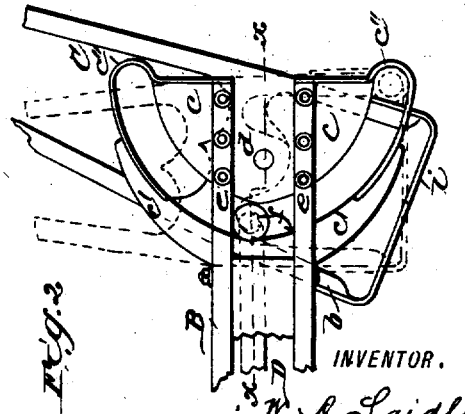
Figure 4:
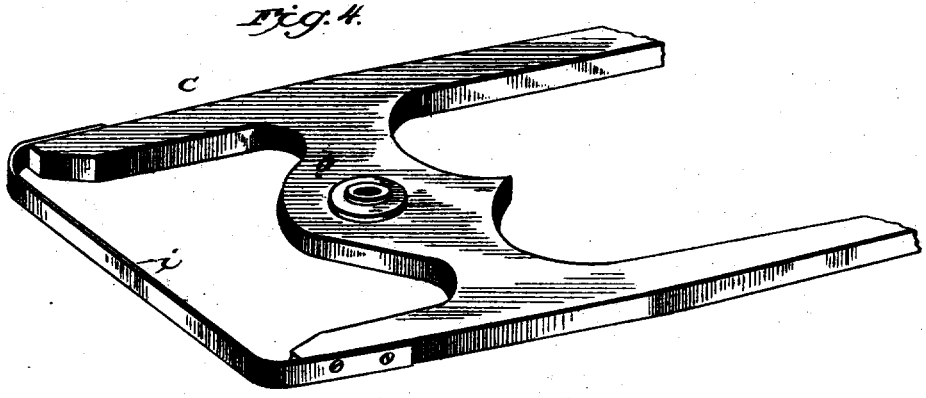
Figure 5:
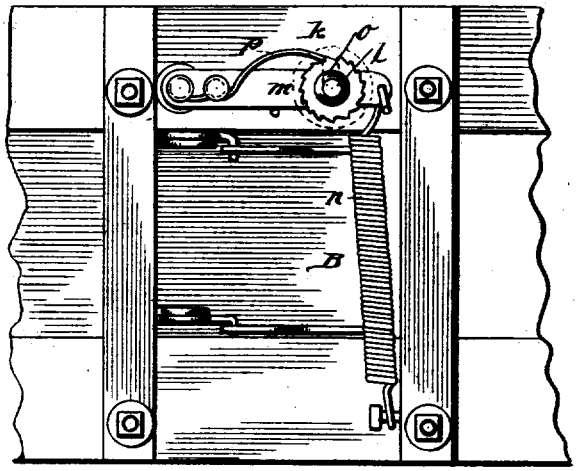
Figure 6:
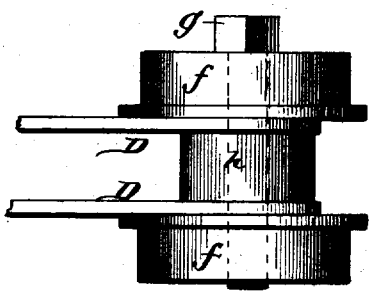

In the accompanying drawings, Figure 1 is a plan view of the press. Fig. 2 is a plan view of a portion of the press, showing another position of the sweep and connected movable parts. Fig. 3 is a central longitudinal section on line *x x*, Fig. 2. Fig. 4 is a perspective view of the sweep. Fig. 5 is a side view of the friction-rollers detached and enlarged. Fig. 6 is a side view of a portion of the press-box.

The follower or traverser A works in the horizontal press-box B, into which hay or other material to be baled is introduced through the opening *a* in its upper side. Said follower is worked by a sweep or horse-lever, C, by means of a pitman, D, composed of two parallel bars pivoted to the follower, as shown in Fig. 1. The sweep vibrates in a horizontal plane, its head *b* being pivoted between conical plates *c c* by means of a vertical bolt, *d*, passing through the center. These plates *c c* are secured in horizontal position to and between the front extensions, *e e*, of the press-box B, and arranged with their apexes pointing toward the follower A. Behind the plates *c c*, and parallel to their conical edges, but separated therefrom by a narrow space, are two semicircular bars, *c′ c′*, whose ends are braced by curved iron straps *c″*, attached to the plates *c*. The inner edges of the bars *c′ c′* are parallel to the opposite edges of plates *c c*. Thus a curved slot is formed between the plates *c* and bars *c′*, the center of which is slightly angular or eccentric to the general curve of the slot. There being two sets of guides, *c* and *c′*, there are consequently two such curved slots, and in them run flanged anti-friction rollers *f*, that work on a vertical bolt or rod, *g*. Between these friction-rollers is a third roller, *h*, which turns on the same rod *g* and works in contact with the edges of the recessed portion of the head *b* of the sweep. The rod passes through the forward ends of the pitman-bars D, they being arranged, respectively, above and below the central friction-roller, *h*, and between the flanged anti-friction rollers *f*. The flanges of the latter work on the inner side of the opposite edges of the plates *c* and bars *c′*.

The recess in the head of the sweep C has a general resemblance to the letter W when formed with curves and no regular angles—that is to say, the recess extends backward on each side of the central portion where the pivot-ball *d* passes through. There is thus a socket or cavity on each side, which receives the friction-roller *h* at each vibration of the sweep. The rear extensions of the sweep-head are shown connected by an iron strap, *i*, which supports and strengthens such extensions.

When the sweep C is at right angles to the press-box, as shown in Fig. 1, the follower is in rear of the opening *a*, so that hay may be introduced. Then, as the sweep is reversed or carried around to the position shown in Fig. 2, the follower is pushed forward and the hay forced into the press-box, and the instant the central friction-roller, *h*, passes beyond the central point shown in Fig. 2—that is to say, past the angle or center of the curved slot—the elastic pressure of the hay against the follower forces it backward and the rollers traverse the slots until arrested by the curved braces *c″*, and the parts are then in the position shown in dotted lines, Fig. 2, and ready to repeat the operation.

After the follower has been withdrawn from the press-box the cylindrical roller *k* is drawn down and folds inward the hay which projects beneath it. This roller is fixed on a shaft, *l*, that is free to work up and down in slots in the sides of the box B. The ends of the shaft *l* pass through lever-arms *m*, pivoted to the outer sides of the box, and springs *n* serve to draw down said arms, and thereby the roller also. A ratchet, *o*, is affixed to the roller-shaft, and a pawl, *p*, prevents the roller rotating backward when the follower withdraws from the press-chamber, thus folding inward the hay that projects beneath said roller.

I am aware that a longitudinally ribbed or grooved roller has been employed, the same having been arranged in a hood or cover specially constructed for the purpose.

What I claim is—

1. In a hay-press of the class hereinbefore described, the combination of the curved bars *c′ c′*, arranged as specified, and conical plates *c c*, whereby a curved slot having an eccentric middle portion is formed between them, the curved straps that connect such parts *c c′*, the pivoted sweep having the head recessed, the follower, pitman, and bolt, and flanged anti-friction rollers and central roller, all as shown and described.

2. In a hay-press of the class hereinbefore described, the combination, with the follower and the press-box having slatted sides, of the cylindrical roller, lever-arms pivoted to the outer sides of the press-box, the springs, and ratchet and pawl, all constructed and arranged as shown and described.

WILLIAM A. LAIDLAW.

Witnesses:
R. A. BOLICK,
G. W. BROWN.